INVENTOR.
IVAN W. KEITH

United States Patent Office 2,844,338
Patented July 22, 1958

2,844,338

VERTICAL VELOCITY THRUST CONTROL FOR HOVERING V. T. O. AIRCRAFT

Ivan W. Keith, San Diego, Calif., assignor to The Ryan Aeronautical Co., San Diego, Calif., a corporation of California Application January 3, 1956, Serial No. 557,079

3 Claims. (Cl. 244—77)

The present invention relates generally to control of aircraft and more particularly to altitude control for vertical take-off and landing aircraft, the control being operative during hovering flight of the aircraft.

The primary object of this invention is to provide a device which provides the pilot with a means of direct control of positive and negative vertical velocity.

Another object of this invention is to provide a device which enables the pilot to maintain a constant vertical velocity, thereby providing a controlled rate of ascent or descent proportional to the power lever setting.

Another object of this invention is to provide a device which automatically corrects throttle over-control in hovering.

Another object of this invention is to provide a device which provides artificial damping of erratic control of vertical motion.

Another object of this invention is to provide a device by means of which the pilot is enabled to attain and maintain zero vertical velocity for hovering attitude of the aircraft.

Another object of this invention is to provide a device which prohibits vertical acceleration of the aircraft except on command of the pilot.

Another object of this invention is to provide a device of the aforementioned character which is operative in vertical flight only, thereby allowing complete control by the pilot while the aircraft is in horizontal flight.

Another object of this invention is to provide a device of the aforementioned character which is inoperative while the control lever is moving, and operative when motion of the lever ceases, thus providing means for the pilot to override the control.

Another object of this invention is to provide a device which is adapted for fabrication from many different materials, so that the choice of material can be according to the dictates of availability and price considerations, the exact sizes and proportions being matters easily determined to suit particular conditions and needs.

Another object of this invention is to provide a device which is practicable and inexpensive to manufacture.

Finally, it is an object to provide a vertical velocity thrust control for hovering V. T. O. aircraft of the aforementioned character which is simple, safe and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Many devices relating to altitude control for aircraft have been brought forward and are now in use. It has been found that substantially all of these devices rely on a static pressure source for the altitude reference, and can not be adapted for use on a vertical take-off and landing aircraft due to the types of motion peculiar to hovering flight.

It is important to realize that without a controlled rate of ascent or decent, movement of the power lever produces an engine thrust which almost invariably differs from the aircraft weight and a vertical acceleration results. If it is assumed that the hovering aircraft is thus permitted to attain a downward acceleration, considerable altitude is lost before the engine thrust can be increased sufficiently to stop both the acceleration and the downward velocity. Once the downward motion is halted, unless the throttle is repositioned with extreme accuracy and perfect timing by the pilot, an upward acceleration then results.

Since the vertical velocities achieved during hovering are not large, practically no aerodynamic damping is produced. The result is that any change in engine throttle setting, above or below the instantaneous thrust equal to weight value, produces a change in engine thrust which causes a vertical acceleration of the aircraft either up or down. The pilot is thus attempting to control altitude by means of a control lever which produces the second derivative of altitude, vertical acceleration.

In addition, due to lag in response of the engine, the change in thrust called for by the pilot is not realized instantaneously. The pilot is required to anticipate or "lead" his control considerably to maintain a near constant altitude. Since at times, because of this "lead," the control must be moved in the opposite direction to what at that instant corresponds to the required velocity correction, there is always the possibility that the pilot's control may become dangerously out of phase with the actual motion of the aircraft, resulting in a divergent system. It will be evident that, especially in vertical landing when the aircraft nears the ground, this divergent system could very well produce disastrous results.

Figure 1:
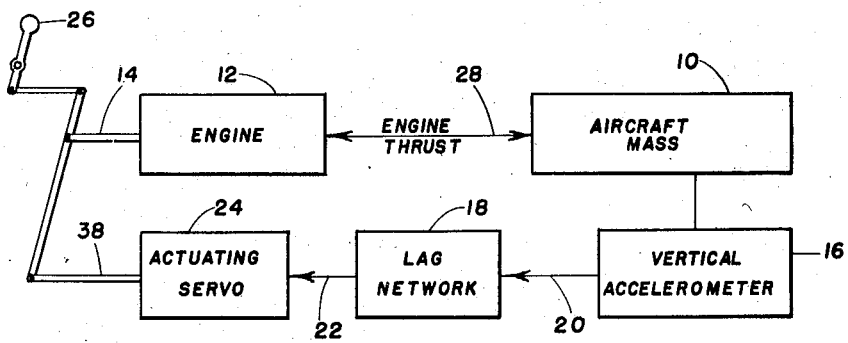
Figure 1 is a schematic drawing of the basic device comprising a vertical accelerometer, an electrical lag network, and a throttle positioning servo-mechanism installed in the aircraft in connection with the engine and throttle control.

Referring now to the drawings, and first specifically to Fig. 1, there is shown diagrammatically an aircraft 10 having an engine 12, and a throttle control 14 operably connected thereto. A sensitive vertical accelerometer 16 is used to detect very minute vertical acceleration of the aircraft 10. The output of the accelerometer 16 passes through a lag network 18 which produces a short time integration of the acceleration signal 20. In La Placian notation, an acceleration A will produce an output from the lag network of $KA/TS+1$ where, $A$=Acceleration, $K=A$ gain factor, $T$=The lag time constant, and $S$=The La Place operator. This output, as shown above, corresponds to the integral of the acceleration for short periods of time, or vertical velocity. This velocity signal 22 is used to position a servo mechanism 24 which drives the engine throttle 14 in a direction opposite to that being produced by the pilot's control lever 26 movements.

It will be evident that the engine throttle 14 will be re-positioned by the control at a point which will produce zero vertical acceleration, or a constant velocity, regardless of the setting of the lever by the pilot. Since movement of the pilot's control lever 26 now produces velocity for short time intervals rather than acceleration, artificial damping of vertical motion has been obtained.

The instant control automatically resets the engine throttle 14 to produce a thrust 28 equal to the aircraft mass 10, so that there is no residual acceleration. For example, as the pilot advances the control lever 26, the engine thrust 28 increases to greater than the aircraft mass 10, causing the aircraft 10 to accelerate upward. The upward acceleration, measured by the accelerometer 16, producing electrical signals operating the control device, which reverses the direction of the power lever 26 until the thrust 28 is again equal to the aircraft mass 10, resulting in zero output from the accelerometer 16. After the original acceleration, caused by moving the control lever 26, no further accelerations or decelerations are permitted by the system. The result is a constant velocity either up or down and proportional to the control lever 26 setting.

Figure 2:
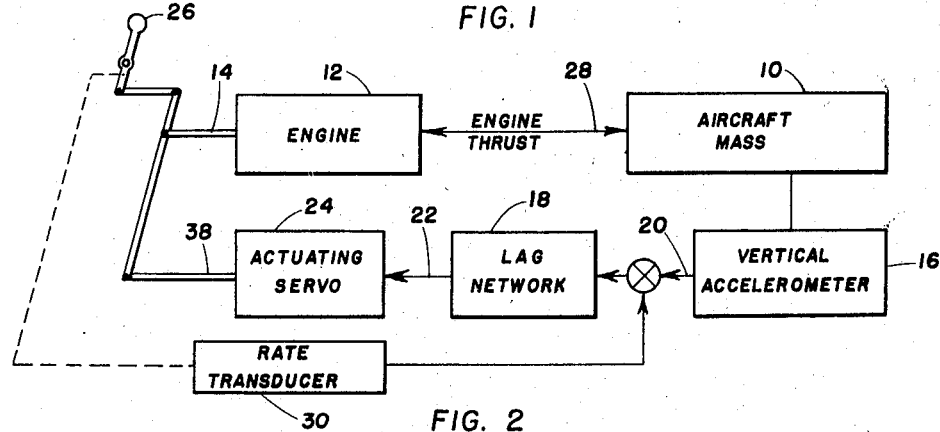
Figure 2 is a schematic drawing of the device of Figure 1 and having added means for rendering the device inoperative while the control lever is moving, and operative when motion of the lever ceases.

Referring now to Figure 2, there is diagrammatically illustrated therein a modified form of the invention. The modification entails simply the addition of a rate transducer 30 operably interposed between the pilot's control lever and the accelerometer 16 and receiving the acceleration signal 20 therefrom.

The transducer is actuated by motion of the pilot's control lever 26 and transduces the energy received therefrom into electrical energy acting in a direction opposite to the acceleration signal 20, nullifying the acceleration signal to the lag network 18. This renders the invention inoperative while the control lever 26 is in motion, allowing the pilot to command initial acceleration when necessary or desired.

Figure 3:
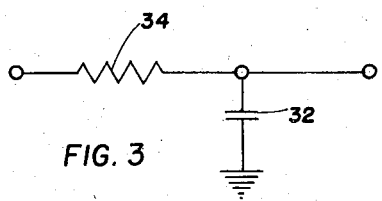
Figure 3 is a diagrammatic drawing of a suitable lag network.

When motion of the pilot's control lever 26 ceases, the signal from the transducer 30 also ceases, allowing the acceleration signal 20 to again reach the lag network 18, from which the velocity signal 22 operates the servo 24, bringing the thrust 28 back to parity with the mass 10, and reducing the acceleration again to zero. As best shown in Figure 3, the lag network comprises in its simplest form, a grounded capacitor 32 wired in series with a resistor 34 to provide a suitable time constant.

The resultant curve of the signal 20 when plotted on coordinates of time and current change, represents the short time integration of the acceleration signal 20, and therefore becomes the velocity signal 22.

Since this type of time device is well known in the electrical field, no further explanation will be attempted in this disclosure.

Figure 4:
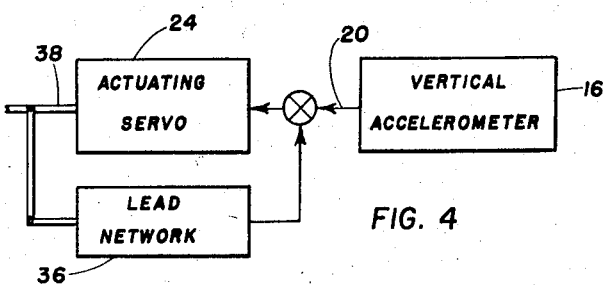
Figure 4 is a modified form of the device where a lead network is substituted for the lag network.

Still another modified form of the invention is illustrated in Figure 4. In this modification, the lag network is omitted, and a lead system 36, which is analogous in effect to the rate transducer 30, is connected in parallel with the actuating servo 24. The lead system 36 is actuated by movement of the actuating arm 38 of the servo, and introduces an electrical current opposite to the acceleration signal 20. This reduces the effect of the signal 20 on the servo 24, and produces a short time interval between the initial acceleration signal 20 and the full actuation of the servo mechanism 24.

The invention does not actually cause the aircraft to hover, but holds the thrust 28 constant with aircraft mass 10 at any set position of the throttle 14. Thus, the pilot can set the throttle 14 for climb, descent, or hover, and the invention will hold the aircraft 10 at that setting without further adjusment by the pilot. The pilot still has full control, since any manual adjustment of the throttle 14 overrides the balanced system, due to the effect of the aforementioned rate transducer 30.

The invention dampens misadjustments of the pilot's control lever 26 to the extent that any applied vertical motion is at a constant rate according to the degree of over-control, by the pilot, thus ensuring accurate vertical flight control.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A vertical velocity thrust control for hovering vertical take-off and landing aircraft comprising: a throttle, sensitive vertical acceleration sensing means; said sensing means comprising a vertical accelerometer producing an electrical signal proportionate to the acceleration; automatic throttle positioning means operably connecting said first mentioned means and said throttle; said throttle positioning means comprising a servomechanism controlled by the electrical signal from the said vertical accelerometer; signal delay means operably interposed between said first mentioned means and said second mentioned means; and means to render said second mentioned means inoperative during motion of the throttle control lever; said signal delay means comprising a network capable of receiving said acceleration signal and producing a velocity signal; said velocity signal being directed to said throttle positioning means.

2. A vertical velocity thrust control for hovering vertical take-off and landing aircraft comprising: a throttle, sensitive vertical acceleration sensing means; said sensing means comprising a vertical accelerometer producing an electrical signal proportionate to the acceleration; automatic throttle positioning means operably connecting said first mentioned means; said throttle positioning means comprising a servomechanism controlled by the electrical signal from the said vertical accelerometer; signal delay means operably interposed between said first mentioned means and said second mentioned means inoperative during motion of the throttle control lever, said signal delay means comprising a lead network operatively connected with said throttle positioning means, and producing an electrical impulse opposing said acceleration signal, thereby delaying the action of said throttle positioning means.

3. A vertical velocity thrust control for hovering vertical take-off and landing aircraft comprising: a throttle; sensitive vertical acceleration sensing means; said sensing means comprising a vertical accelerometer producing an electrical signal proportionate to the acceleration; automatic throttle positioning means operably connecting said first mentioned means and said throttle; said throttle positioning means comprising a servomechanism controlled by the electrical signal from the said vertical accelerometer; signal delay means operably interposed between said first mentioned means and said second mentioned means; and means to render said second mentioned means inoperative during motion of the throttle control lever; said last mentioned means comprising a rate transducer operatively connected with a throttle control lever and producing an electrical current nullifying the said acceleration signal while said lever is in motion.

References Cited in the file of this patent

UNITED STATES PATENTS

| 2,743,071 | Kelley | Apr. 24, 1956 |

FOREIGN PATENTS

| 955,254 | France | Jan. 9, 1950 |